A lifting device for lifting shipping containers has an end frame configured to engage with a shipping container. An extension member is rotatably connected to the end frame at a rearward upper pivot point. A support frame is rotatably affixed to the end frame at a rearward lower pivot point. The support frame is further rotatably affixed to the extension member at a forward upper pivot point. Extension of the extension member rotates the support frame with respect to the end plate, causing the support frame to move the end plate upwards, the end plate then lifting the shipping container. A roller wheel is affixed to the support frame and allows the shipping container to be rolled on a surface when multiple devices are used to lift the shipping container off of the surface.

7 Claims, 2 Drawing Sheets

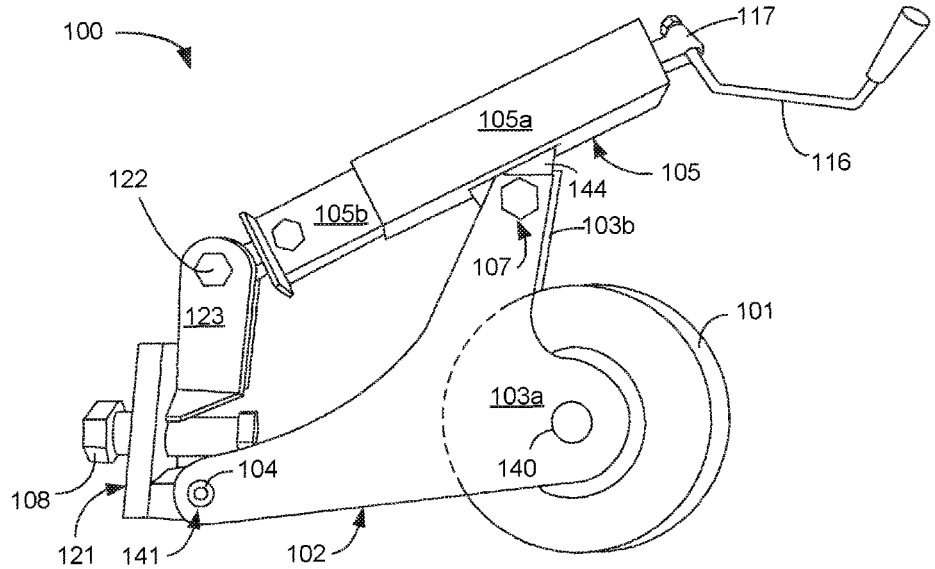

(56) References Cited

U.S. PATENT DOCUMENTS

| | | | | |
|---|---|---|---|---|
| 5,122,027 | A * | 6/1992 | Tabayashi | B62B 3/104 414/454 |
| 5,320,475 | A * | 6/1994 | Pinder | B62B 1/08 414/343 |
| 5,380,029 | A * | 1/1995 | Portilla | B60P 3/42 280/414.5 |
| 5,924,832 | A * | 7/1999 | Rice | E04H 12/34 135/908 |
| 6,821,066 | B2 * | 11/2004 | Wehrli | B60P 3/40 410/32 |
| 6,830,422 | B2 * | 12/2004 | Whitley | B60P 3/40 414/458 |
| 2009/0179400 | A1 * | 7/2009 | Van Der Plaats | B60D 1/66 280/431 |
| 2010/0226740 | A1 * | 9/2010 | Humble | B60P 1/6409 414/458 |
| 2012/0326106 | A1 * | 12/2012 | Murri | B60S 9/08 254/420 |
| 2016/0376806 | A1 * | 12/2016 | Vetesnik | F16M 11/42 52/121 |

\* cited by examiner

CONTAINER MOBILITY LIFT

CROSS REFERENCE TO RELATED APPLICATIONS

This application claims the benefit of U.S. Provisional Application No. 62/329,529 filed on Apr. 29, 2017, the entire contents of which are herein incorporated by reference.

BACKGROUND AND SUMMARY

A lifting device for lifting shipping containers has an end frame configured to engage with a shipping container. An extension member is rotatably connected to the end frame at a rearward upper pivot point. A support frame is rotatably affixed to the end frame at a rearward lower pivot point. The support frame is further rotatably affixed to the extension member at a forward upper pivot point. Extension of the extension member rotates the support frame with respect to the end plate, causing the support frame to move the end plate upwards, the end plate then lifting the shipping container. A roller wheel is affixed to the support frame and allows the shipping container to be rolled on a surface when multiple devices are used to lift the shipping container off of the surface.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
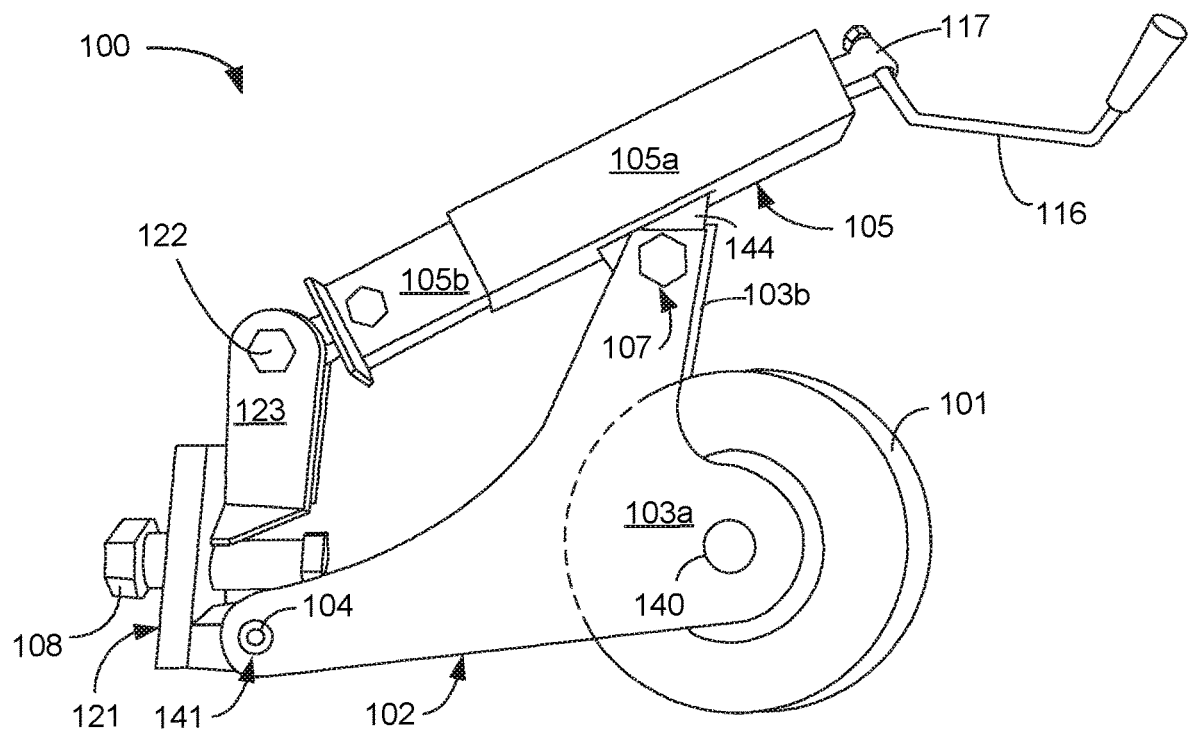
FIG. 1 depicts a container mobility lift according to an exemplary embodiment of the present disclosure.

FIG. 1 depicts a container mobility lift device 100 according to an exemplary embodiment of the present disclosure. The device 100 comprises a roller wheel 101 supported by a wheel frame 102. In the illustrated embodiment, the wheel frame 102 comprises a right side frame member 103a and a left side frame member 103b, and the roller wheel 101 is generally disposed between the right side frame member 103a and left side frame member 103b, as further discussed herein.

An end frame 121 extends between the right side frame member 103a and left side frame member 103b on an opposite (rear) end of the device from the roller wheel 101. The end frame 121 is rotatably connected to the right side frame member 103a and left side frame member 103b at a pivot point 104. In other words, the end frame 121 pivots with respect to the right side frame member 103a and left side frame member 103b at pivot point 104.

Figure 3:
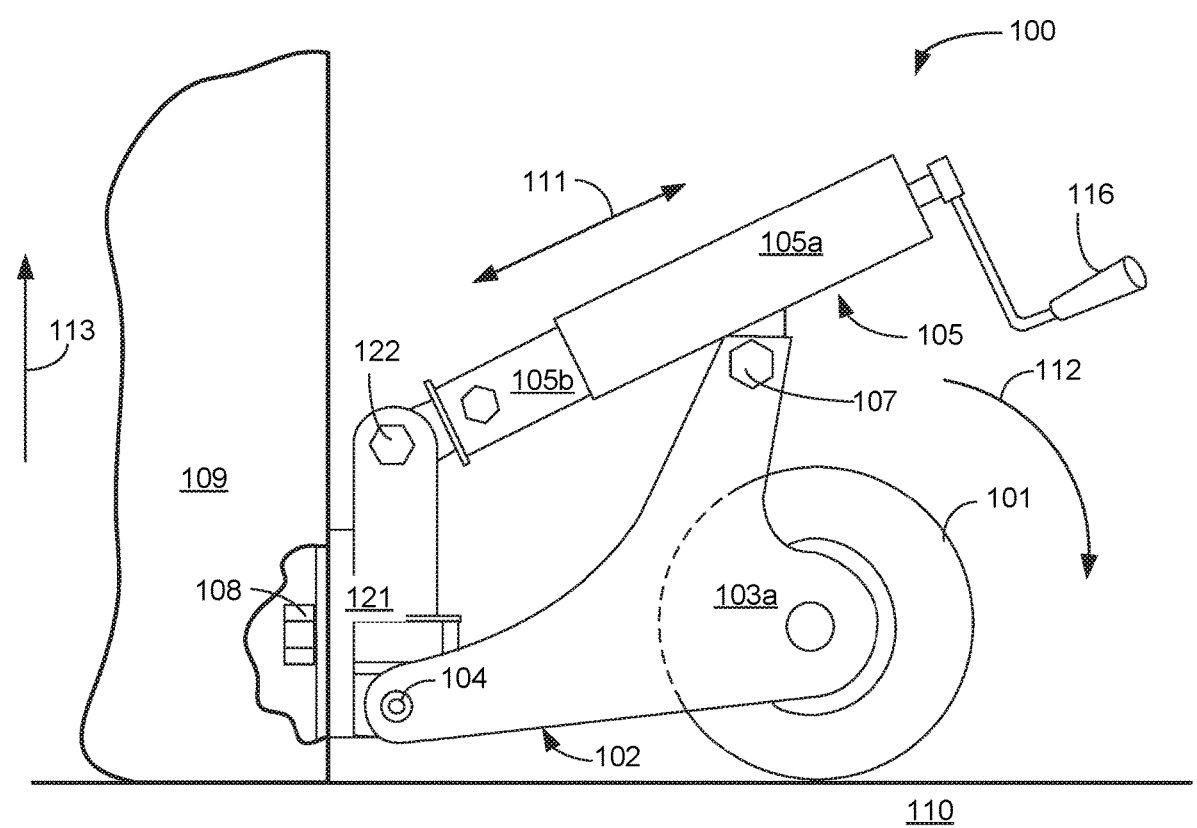
FIG. 3 is a side representation of the device of FIG. 1, attached to a shipping container, illustrating operation of the device.

A protruding container lock 108 extends rearwardly from the end frame 103 and engages with an opening (not shown) on a shipping container 109 (FIG. 3). In this regard, the protruding container lock 108 is received by one of the standard openings on the shipping container that are used to attach lifting rigs or slings or the like. In use of the container mobility lift device 100, a plurality of devices 100 would be used to lift a container. For example, there may be one device 100 near each lower corner (not shown) of the shipping container, for a total of four (4) devices that would be used to lift the shipping container.

An extension member 105 extends between the end frame 121 and the wheel frame 102. The extension member 105 is extendable in length by the user, who adjusts the length of the extension bar to cause the end frame 121 to pivot with respect to the wheel frame 102, as further discussed herein. The end plate 121 pivots with respect to the extension member 105 at a pivot point 122. In this regard, a bracket 123 extends upwardly from the end plate 121 and rotatably connects the end plate 121 to the extension member 105, at pivot point 122.

The extension member 105 comprises an outer portion 105a received by an inner portion 105b. The inner portion 105b extends from the outer portion 105a and retracts into the outer portion 105a upon actuation by a handle 116 on the extension member. In the illustrated embodiment, the extension member 105 is a square-mount trailer jack that utilizes a screw mechanism (not shown) to cause the extension and retraction of the inner portion 105b with respect to the outer portion 105a. In other embodiments, other means for extending the extension member 105 are used.

A lug 144 extends downwardly from the extension member 105 along a bottom side of the outer portion 105a of the extension member. The lug 144 comprises an opening (not shown) for receiving an axle (not shown) that extends through the right side frame member 103a, passes through the lug 144, and then through the left side frame member 103b (not shown). The axle allows the extension member 105 to pivot at pivot point 107 with respect to the wheel frame 102, as further discussed herein.

In the illustrated embodiment, the right side frame member 103a comprises a stiff structural plate with three openings (not shown) spaced apart from one another in a generally triangular orientation. A first opening 140 receives an axle (not shown) that connects the roller wheel 101 to the right side frame member 103a and left side frame member 103b. A second opening 141 receives a fastener (not shown) that rotatably connects the wheel frame 102 to the end plate 121. A third opening (not shown) at pivot point 107 receives the axle that extends through the lug 144. The left side frame member 103b is substantially a mirror image of the right side frame member 103b.

The opening 140, the pivot point 107, and the opening 141 are generally in a triangular orientation with respect to one another. In this regard, the pivot point 107 is uppermost, at a top point of the right side frame member 103a near a forward end of the right side frame member 103a. The opening 140 is located downwardly from the pivot point 107 near the forward end of the right side frame member 103a. The opening 141 is at a rearward end of the right side frame member 103a. The pivot point 107, the opening 140, and the opening 141 are generally spaced apart in the shape of a right triangle, with the opening 140 at the lower right of the right triangle, the pivot 107 above, and the opening 141 at the opposite end.

Figure 2:
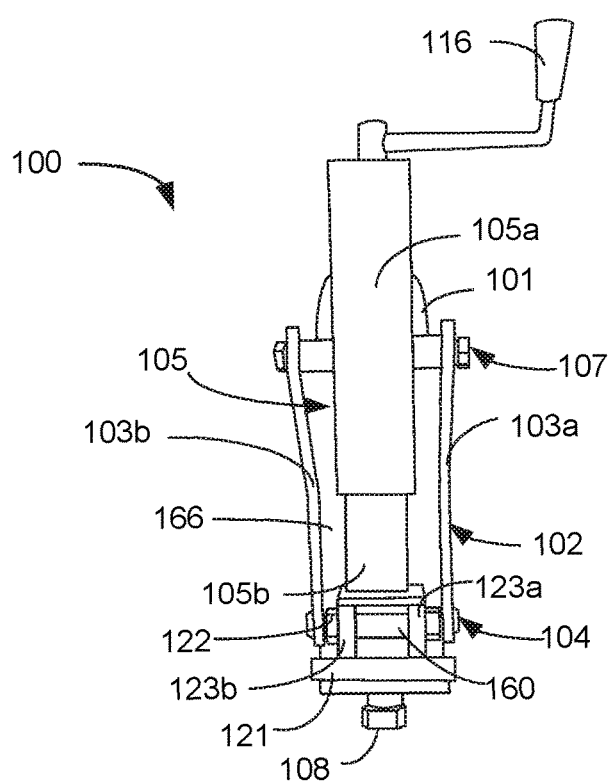
FIG. 2 is a top view of the container mobility lift of FIG. 1.

FIG. 2 is a top view of the device 100 of FIG. 1. As discussed above, the frame 102 is comprised of the right side frame member 103a and left side frame member 103b. The right side frame member 103a and the left side frame member 103b are rigidly affixed to a support plate 166 that extends between the right side frame member 103a and left side frame member 103b. Brackets 123a and 123b extend upwardly from the end plate 121 and support an axle 160 which serves as the pivot point 122 between the end plate 121 and the inner portion 105b of the extension member 105.

FIG. 3 is a side view of the device 100 of FIG. 1 connected to a shipping container 109 in operation of the device 100. Only the lower right corner of the shipping container 109 is depicted in FIG. 3, and only one device 100 is shown. It is understood that a plurality of devices 100 are required to lift the entire shipping container 109 from a surface.

The container lock 108 secures the end plate 121 to the shipping container 109 while the shipping container 109 is supported on a surface 110, such as the ground. The user actuates the handle 116 to lengthen the extension member 105 as indicated by directional arrow 111. The lengthening of the extension member 105 forces the frame 102 to rotate in the direction indicated by directional arrow 112. This rotation of the frame 102 causes the frame 102 to push upwardly at pivot point 104, which causes the end plate 121 to move upward (in the direction indicated by directional arrow 113) and lift the shipping container 109. When the device 100 is used on four corners of a shipping container to lift the container, the container 109 can then be moved by rolling the container 109 on the rollers 101.

The invention claimed is:

1. A lifting device comprising:
a rigid frame comprising:
a right side frame member comprising a right structural plate with three openings, a first opening, a second opening, and a third opening, the three openings spaced apart from one another on the right structural plate in a substantially triangular orientation;
a left side frame member comprising a left structural plate with three openings, a first opening, a second opening, and a third opening, the three openings spaced apart from one another on the left structural plate in a substantially triangular orientation;
a support plate extending between the right side frame member and the left side frame member, the support plate rigidly affixing the right side frame member to the left side frame member such that the first opening of the right side frame member is aligned with the first opening of the left side frame member, the second opening of the right side frame member is aligned with the second opening of the left side frame member, and the third opening of the right side frame member is aligned with the third opening the left side frame member;
a wheel axle extending through the first openings of the right and left side frame members, the wheel axle supporting a roller wheel, the roller wheel located between the left side frame member and the right side frame member;
a lift axle extending through the second openings of the right and left side frame members, the lift axle rotatably connecting the frame to an L-shaped end plate;
a lug axle extending through the third openings of the right and left side frame members, the lug axle further extending through a lug that extends from an extension member;
the wheel axle corresponding with a roller pivot point and disposed along a front lower edge of the frame, the wheel axle configured to rotatably engage with the roller wheel, the roller wheel configured to roll on a surface;
the lift axle corresponding with a lower rearward pivot point and disposed along a rear lower edge of the frame, the lift axle configured to rotatably engage with the L-shaped end plate, the L-shaped end plate releasably engageable with a lower edge of a shipping container;
the lug axle corresponding with an upper forward pivot point and disposed along an upper edge of the frame, the lug axle configured to rotatably engage with a middle section of the extension member, the extension member extending adjustably between the upper forward pivot point of the frame and the L-shaped end plate, the extension member rotatably engaging with the L-shaped end plate at an upper rearward pivot point;
the extension member comprises a forward portion and a rearward portion, and wherein the L-shaped end plate further comprises a bracket extending upwardly from the L-shaped end plate, the bracket rotatably engaging with the lug extending from the rearward portion of the extension member;
the rigid frame further comprising a lower side edge, a front side edge, and a rearward side edge, the roller pivot point disposed substantially near an intersection of the front side edge and the lower side edge, the upper forward pivot point disposed substantially near an intersection of the front side edge and the rearward side edge, and the rearward lower pivot point disposed substantially near an intersection of the rearward side edge and the lower side edge;
whereby extension of the extension member causes the rigid frame to rotate with respect to the L-shaped end plate and forces the L-shaped end plate upward to lift the shipping container.

2. The device of claim 1, wherein the L-shaped end plate further comprises a protruding container lock, the protruding container lock releasably engageable with the shipping container during lifting of the shipping container.

3. The device of claim 1, wherein the forward portion of the extension member comprises the lug, the lug extending downwardly, the lug rotatably engaging the upper forward pivot point.

4. A lifting device comprising:
an L-shaped end plate configured to releasably engage with a shipping container;
an extension member comprising a rearward portion and a forward portion, the rearward portion extendable from the forward portion upon actuation of the extension member by a user, the extension member rotatably affixed to the L-shaped end plate at a rearward upper pivot point disposed on the rearward portion; and
a support frame rotatably affixed to the L-shaped end plate at a rearward lower pivot point, the support frame rotatably affixed to the forward portion of the extension member at a forward upper pivot point, the support frame comprising:
a right side frame member comprising a right structural plate with three openings, a first opening, a second opening, and a third opening, the three openings spaced apart from one another on the right structural plate in a substantially triangular orientation and a left side frame member comprising a left structural plate with three openings, a first opening, a second opening, and a third opening, the three openings spaced apart from one another on the left structural plate in a substantially triangular orientation;

a support plate extending between the right side frame member and the left side frame member, the support plate rigidly affixing the right side frame member to the left side frame member such that the first opening of the right side frame member is aligned with the first opening of the left side frame member, the second opening of the right side frame member is aligned with the second opening of the left side frame member, and the third opening of the right side frame member is aligned with the third opening the left side frame member;

a wheel axle extending through the first openings of the right and left side frame members, the wheel axle supporting a roller wheel, the roller wheel configured to roll on a surface, the roller wheel located between the left side frame member and the right side frame member;

the wheel axle corresponding with a roller pivot point;

a lift axle extending through the second openings of the right and left side frame members, the lift axle rotatably connecting the frame to the L-shaped end plate, the lift axle corresponding with the rearward lower pivot point;

a lug axle extending through the third openings of the right and left side frame members, the lug axle further extending through a lug that extends from the extension member, the lug axle corresponding with the forward upper pivot point;

the support frame further comprising a lower side edge, a front side edge, and a rearward side edge, the roller pivot point disposed substantially near an intersection of the front side edge and the lower side edge, the forward upper pivot point disposed substantially near an intersection of the front side edge and the rearward side edge, and the rearward lower pivot point disposed substantially near an intersection of the rearward side edge and the lower side edge;

the end plate further comprises a bracket extending upwardly from the end plate, the bracket rotatably engaging with the lug extending from the rearward portion of the extension member;

whereby extension of the extension member rotates the support frame with respect to the L-shaped end plate, causing the support frame to move the L-shaped end plate upwards, and lifting the shipping container.

5. The device of claim 4, wherein the roller wheel is rotatably engaged with the support frame.

6. The device of claim 4, wherein the end plate further comprises a protruding container lock, the protruding container lock releasably engageable with the shipping container during lifting of the shipping container.

7. The device of claim 4, wherein the forward portion of the extension member comprises the lug, the lug extending downwardly, the lug rotatably engaging the forward upper pivot point.

* * * * *